(12) United States Patent
Robbins

(10) Patent No.: US 7,637,154 B1
(45) Date of Patent: Dec. 29, 2009

(54) ADJUSTABLE MEASURING CONTAINER AND CUTTING BOARD

(75) Inventor: Rodney W. Robbins, Florence, AL (US)

(73) Assignee: FoxRun USA, LLC, Ivyland, PA (US)

( * ) Notice: Subject to any disclaimer, the term of this patent is extended or adjusted under 35 U.S.C. 154(b) by 0 days.

(21) Appl. No.: 11/796,068

(22) Filed: Apr. 26, 2007

(51) Int. Cl.
*G01F 19/00* (2006.01)

(52) U.S. Cl. .................... 73/429; 73/426; 33/1 V; 220/530; 220/532; D10/46.2

(58) Field of Classification Search ........... 73/426–429; 33/1 V; 116/227; D10/46.2, 96, 10, 101; D7/698, 699; 220/529, 530, 532; 222/465.1–481
See application file for complete search history.

(56) References Cited

U.S. PATENT DOCUMENTS

| | | | | |
|---|---|---|---|---|
| 1,349,716 A | * | 8/1920 | Elliot | 222/142.3 |
| 1,602,937 A | * | 10/1926 | Rieff | 73/429 |
| 2,042,945 A | * | 6/1936 | Lemay | 73/426 |
| 2,165,642 A | * | 7/1939 | Mayer | 73/429 |
| 2,389,530 A | * | 11/1945 | Miner | 73/426 |
| 2,496,268 A | * | 2/1950 | Chester | 73/429 |
| 2,626,526 A | * | 1/1953 | Chester | 73/429 |
| 2,697,353 A | * | 12/1954 | Setecka | 73/429 |
| 2,796,902 A | * | 6/1957 | Mercury | 269/13 |
| 2,807,168 A | * | 9/1957 | Wipf | 73/427 |
| 2,826,078 A | * | 3/1958 | Setecka | 73/429 |
| 2,854,849 A | * | 10/1958 | Setecka | 73/429 |
| 2,882,732 A | * | 4/1959 | Cercone | 73/429 |
| 3,391,578 A | * | 7/1968 | Connellis | 73/429 |
| 3,416,375 A | * | 12/1968 | Lubman et al. | 73/429 |
| 3,486,665 A | * | 12/1969 | LaCroce | 222/480 |
| 3,598,164 A | * | 8/1971 | August | 269/13 |
| D304,277 S | * | 10/1989 | Wolff et al. | D7/698 |
| 5,182,948 A | * | 2/1993 | Robbins et al. | 73/429 |
| 5,325,717 A | | 7/1994 | Robbins et al. | |
| 5,448,913 A | * | 9/1995 | Robbins et al. | 73/429 |
| 5,474,494 A | * | 12/1995 | Sims | 452/194 |
| D372,176 S | * | 7/1996 | Meisner | D7/698 |
| 5,678,450 A | * | 10/1997 | Robbins et al. | 73/429 |
| D390,072 S | * | 2/1998 | Miller | D7/698 |
| 5,904,271 A | * | 5/1999 | Collins et al. | 222/158 |
| 6,125,699 A | * | 10/2000 | Molenaar | 73/429 |
| D440,472 S | * | 4/2001 | Paschal et al. | D7/698 |
| D442,037 S | * | 5/2001 | Wong | D7/698 |
| 6,359,239 B1 | * | 3/2002 | Missler et al. | 177/25.16 |
| 6,371,470 B1 | * | 4/2002 | Ward | 269/289 R |
| 6,488,187 B2 | * | 12/2002 | Sheffler et al. | 222/480 |
| 6,536,753 B1 | * | 3/2003 | Keener | 269/13 |
| 7,040,611 B2 | * | 5/2006 | Poynton | 269/289 R |
| 2001/0040328 A1 | * | 11/2001 | Keener | 269/289 R |

(Continued)

OTHER PUBLICATIONS

Printout from website of PamperedChef.Com showing "cutting board with cups", circa 2006-2007.

*Primary Examiner*—David A. Rogers
(74) *Attorney, Agent, or Firm*—Gregor N. Neff, Esq.

(57) ABSTRACT

A cutting board is fitted with a removable cup, preferably adjustable, which is positioned so as to receive cut food particles swept off the board into the cup. A barrier is provided on the board surface to prevent spillage of food which misses the cup. The cup is semi-cylindrical and fits into a recess in the board.

6 Claims, 5 Drawing Sheets

U.S. PATENT DOCUMENTS

| | | |
|---|---|---|
| 2005/0039607 A1 * | 2/2005 | Comfield .................... 99/324 |
| 2005/0097953 A1 * | 5/2005 | Judith ....................... 73/429 |
| 2005/0160807 A1 * | 7/2005 | Kilduff et al. ................ 73/426 |

* cited by examiner

# US 7,637,154 B1

ADJUSTABLE MEASURING CONTAINER AND CUTTING BOARD

This invention relates to measurement devices, and particularly to adjustable measurement devices for measurement of food quantities. More specifically, the invention relates to cutting boards, devices and methods for facilitating the cutting and measurement of food quantities using the cutting board.

One problem in the preparation of foods is in the measurement of a desired quantity of foods after they have been cut on a cutting board. Usually, it is required to scrape the food particles off the board with a knife edge or other tool into a measuring cup. This often entails considerable spillage, and can be slow and difficult.

It has been proposed in the past to attach measuring spoons or a set of measuring cups to a cutting board, theoretically to improve the convenience to the user. However, selecting, manipulating and filling the measurement devices often is cumbersome and still results in excessive spillage.

It is an object of the present invention to solve or substantially alleviate the foregoing problems.

It is a more specific object of the invention to provide an efficient measurement system which is relatively easy to use and flexible, and which increases the speed with which cutting and measurement can be done, and to facilitate the preparation of foods.

More specifically, it is an object to provide a device and method in which the foregoing objects are met economically, using a device which is relatively compact.

In accordance with the present invention, the foregoing objects are met by the provision of an adjustable measuring device and method utilizing the combination of a cutting board with an adjustable measuring container secured thereto in a position so that the cut food particles on the surface of the cutting board can be simply swept off of the upper surface of the board into the measuring container.

In another aspect, the invention provides a removable cup mounted in a recess in a cutting board, with an open top for the cup near the upper surface of the board so that food particles can be swept into the cup, thus providing for easy removal.

Preferably, the measuring container is adjustable in place, while the container is secured to the cutting board. Additionally, the container can be adjusted while separated from the cutting board so that it can be used independently as an adjustable measuring device.

It is further preferred that a barrier be provided extending upwardly from the upper surface of the cutting board to prevent food particles from being swept off of the board if they miss the measuring container.

It also is preferable that the measuring container be of a shape so that can be mounted in a recess in the cutting board, without occupying an excessively large amount of surface area on the board.

In particular, a semi-cylindrical cup has been supplied, in accordance with the invention, with a rotatable barrier in the cup to adjust its volume. Preferably, the moveable barrier has a sealing member to form a seal to hold juices from cut food items in the cup without spillage.

In use of the invention, it is preferred that a cutting board with an attached adjustable measuring container is provided and that the adjustable measuring container is set at a desired volume. Food items cut on the board then are simply swept into the cup until it is filled to the desired level, the cup is removed from the board and the contents deposited in another container, or otherwise used.

The invention thus provides an extremely convenient, easy-to-use, easily-cleanable, compact cutting and measuring device and method.

The foregoing and other objects and advantages of the invention will be set forth in or apparent from the following description and drawings.

IN THE DRAWINGS

GENERAL DESCRIPTION

Figure 1:
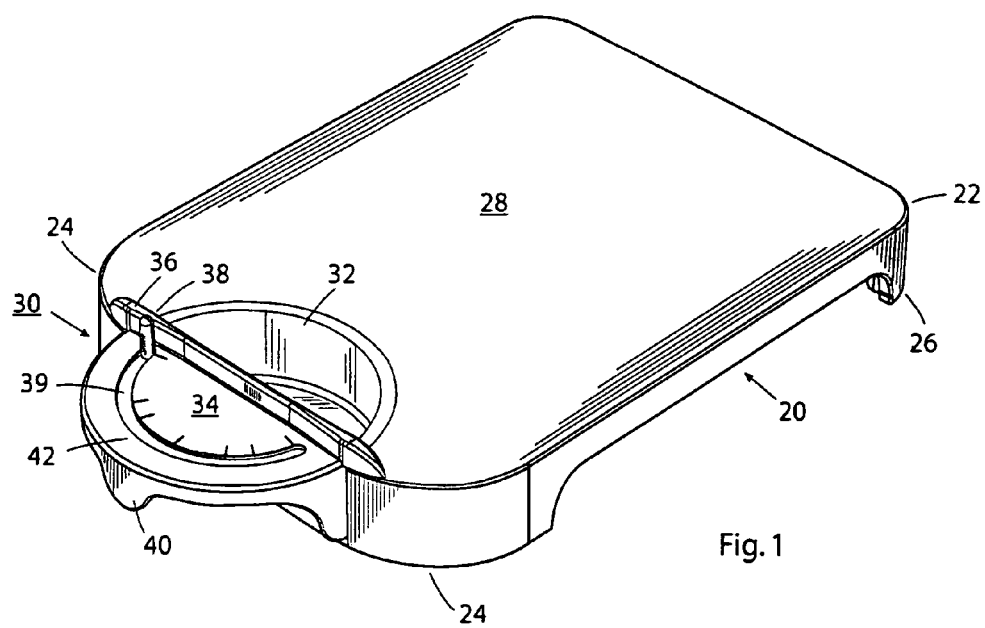
FIG. 1 is a perspective view of a cutting board measuring device in accordance with the present invention.

The measuring cutting board device 20 shown in FIG. 1 includes a cutting board 22 having front and rear leg structures 24 and 25, and an upper cutting surface 28. The cutting board preferably is molded of plastic, but also can be made of wood or other suitable materials.

Figure 3:
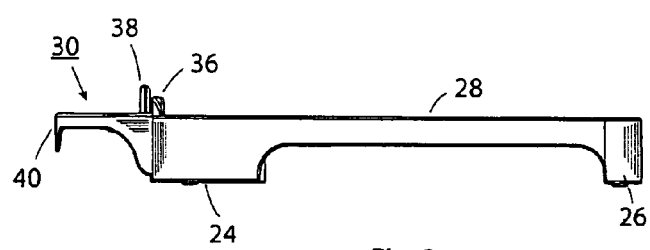
Figure 4:
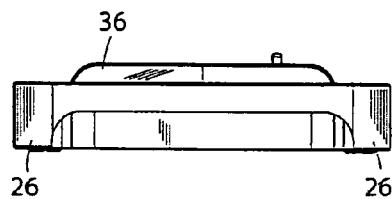

A measuring device 30 is provided with a semi-cylindrical cup 32 with an upper measurement dial 34, and a handle 40. A barrier bar 36 extends upwardly above the surface of the board, as it is shown in FIGS. 1, 3 and 4.

Figure 2:
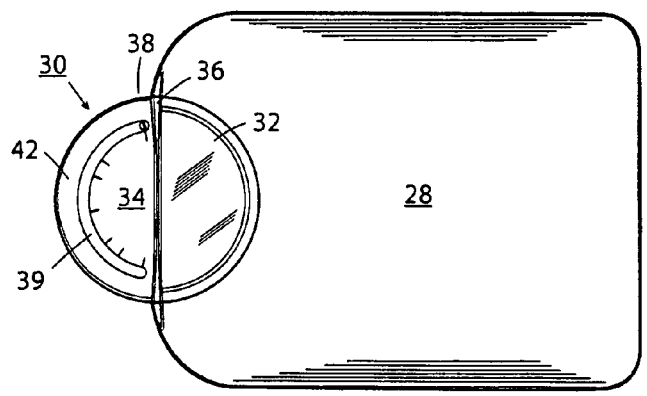
FIGS. 2, 3 and 4 are, respectively, top plan, side elevation and rear elevation views of the device shown in FIG. 1.
Figure 6:
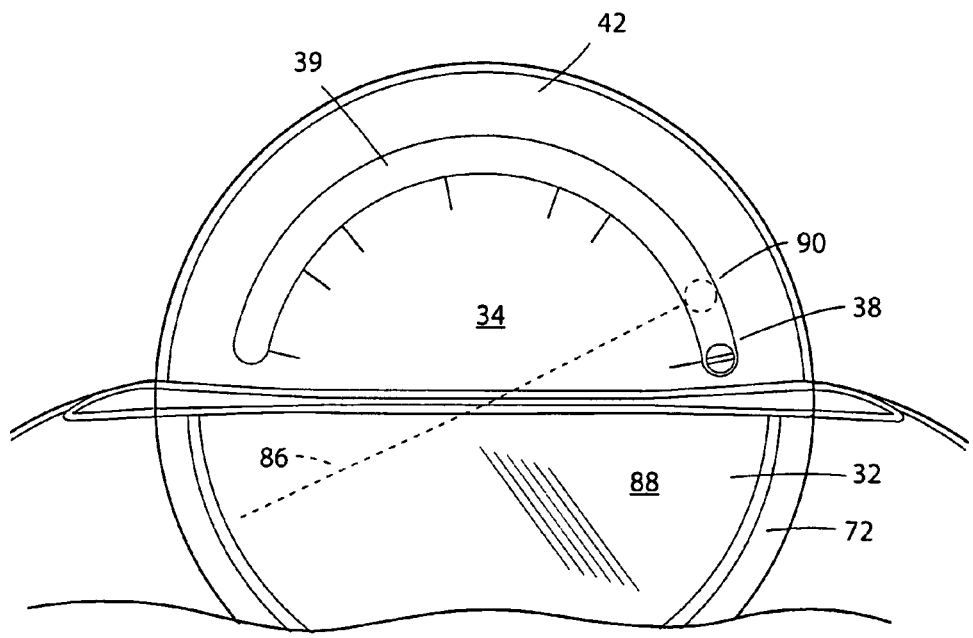
FIG. 6 is an enlarged top plan view of a portion of the device shown in FIG. 1.

An adjustment lever 38 extends upwardly through a semi-circular slot 39 in the measurement dial. As it is shown in FIG. 6, as well as FIGS. 1 and 2, the dial 34 has markings indicating that when the lever 38 is aligned with one of the marks, the cup will measure the amount indicated on the dial. The dial has markings of ⅛ cup, ¼ cup, ⅓ cup, ½ cup, ⅔ cup, ¾ cup, and one cup, moving clockwise from the left in FIG. 6. Corresponding metric measurements are provided in the outer portion 42 of the dial surface.

Figure 5:
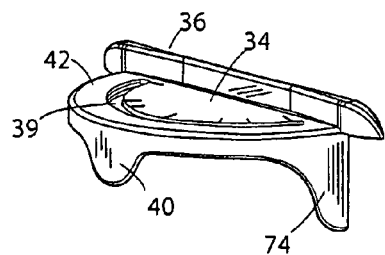
FIG. 5 is an exploded view of the device shown in FIG. 1.
Figure 5:
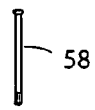
Figure 5:
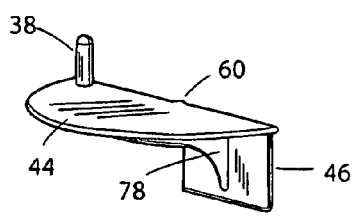
Figure 5:
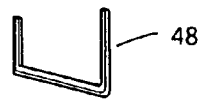
Figure 5:
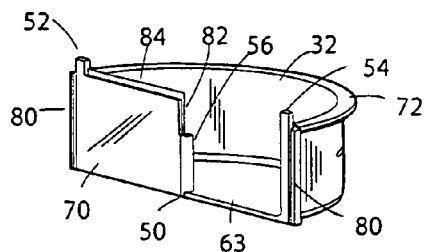
Figure 5:
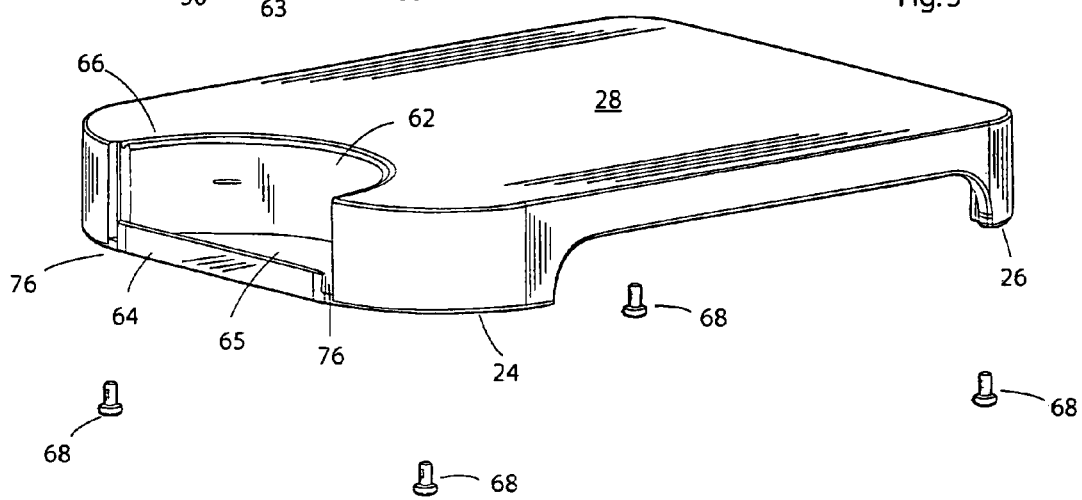

As it is shown in FIG. 5, the cutting board has a semi-circular recess 62 with a shallow edge recess 66 at the top, and a bottom wall 65 to form a receptacle for the cup. The cup 32 has an outer rim 72 which fits down into the recess 66 to bring the upper edge of the top opening of the cup substantially in the same plane with the upper surface 28 of the cutting board when the cup is mounted in the receptacle in the board. A vertical barrier 64 extends upwardly from the bottom wall 65 of the recess 62 in order to releasably retain the cup in the receptacle until it is desired to lift it out. Gaps are provided at the edges 76 between the barrier 64 and the side walls of the recess so as to allow wash water to drain out easily when the board is washed.

The dial assembly is shown at the top of FIG. 5 and includes two vertical flanges 74 extending downwardly at opposite sides of the assembly. The flanges 74 fit into and are secured with adhesive in vertical slots 80 in the edges of the cup 32 to securely mount the assembly onto the cup.

A semi-circular rotor 44 is provided to which the lever 38 is secured Depending from one edge of the rotor 44 is a barrier member or panel 46 of approximately square shape. A sealing member 48 is secured to the edge of the barrier panel around the bottom and vertical sides to seal the barrier panel relative to the inside wall of the cup to prevent leakage of liquids from the portion of the cup that receives cut food.

A hub 56 is provided, and a stainless steel pin or axle 58 fits through a cylindrical hub 60 on the rotor with clearance, and is force-fitted into the hub 56 to provide an axle on which the rotor 44 can rotate. Rotation of the rotor moves the barrier 46 to various angular positions in the cup 32 to provide an opening of variable size to receive cut food particles. The barrier member 44 covers the portion of the cup which is not to receive food particles, thus effectively reducing the volume of the cup in proportion to the cup area covered by the rotor.

Figure 7:
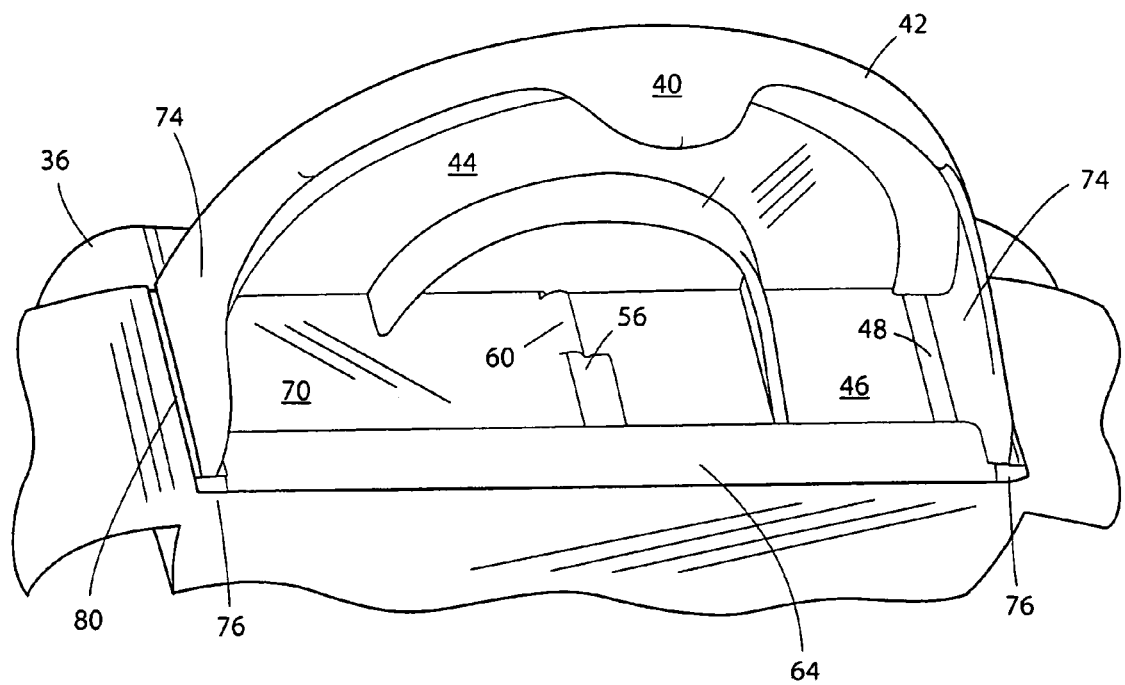
FIG. 7 is a bottom perspective view of a portion of the device shown in FIG. 1.
Figure 8:
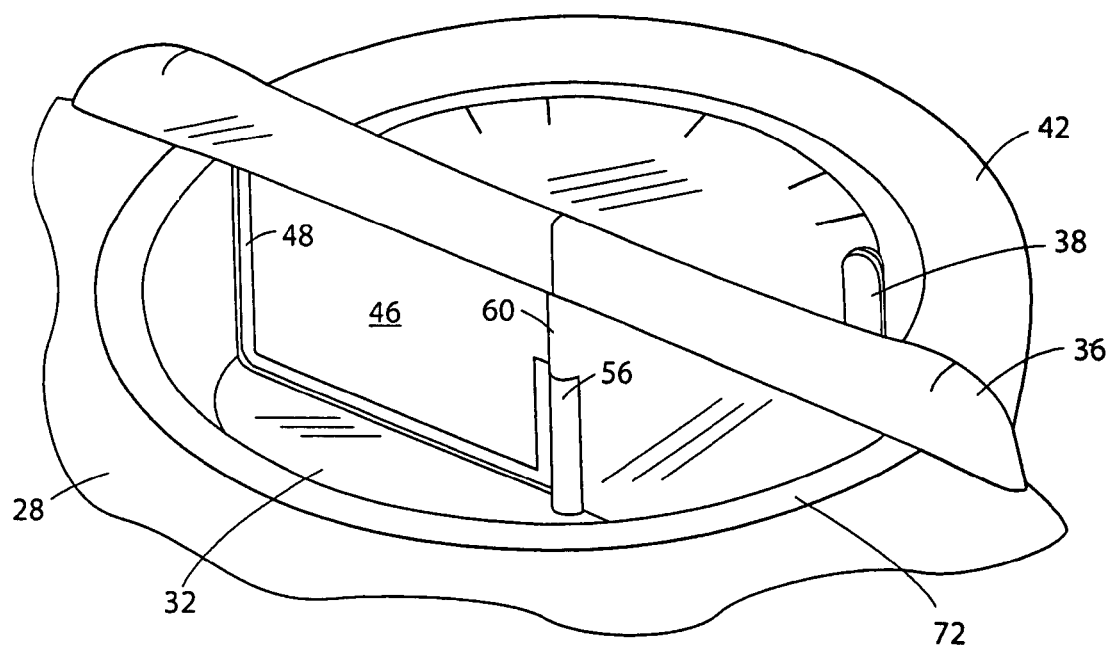
FIG. 8 is an enlarged perspective view of another portion of the device shown in FIG. 1.

As it is shown in FIG. 7, a curved reinforcing rib 78 is secured to the bottom of the rotor and to the rear surface of the movable barrier 46.

A vertical wall 70 closes the front of the cup. Thus, the food receiving volume in the cup is the volume between the barrier 46 and the wall 70.

Rubber feet 68 are secured in the lower surfaces of the leg portions 24 and 26, etc.

Shown in FIG. 6 by means of a dashed line 86 is an exemplary position of the barrier member 46 when the lever 38 is moved slightly counterclockwise, e.g., to the position shown in dashed lines 90. This creates an opening 88 in the cup which is slightly less than one cup in measure. Similarly, as the lever 38 is rotated counterclockwise, the open area in the cup is reduced as the cover 44 covers more of the cup area, thus reducing the measuring capacity correspondingly.

Figure 9:
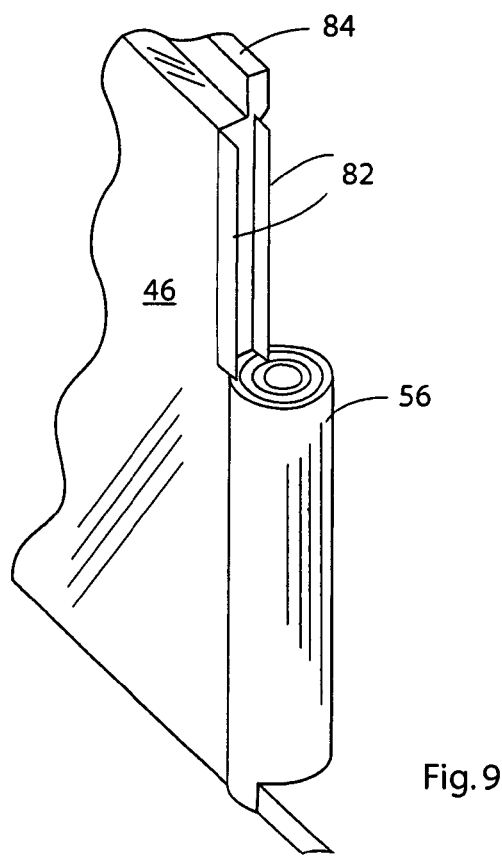
FIG. 9 is a perspective view of another portion of the device shown in FIG. 1.

As it is shown in FIG. 9, two flexible vertical plastic flaps 82 are provided to bear against the hub 60 and provide a tight seal to prevent juices from leaking from the measuring container, and a projecting ridge or flange 84 extends upwardly into the interior of the barrier member 36 to secure the barrier member 36 relative to the remainder of the measuring device.

Figure 11:
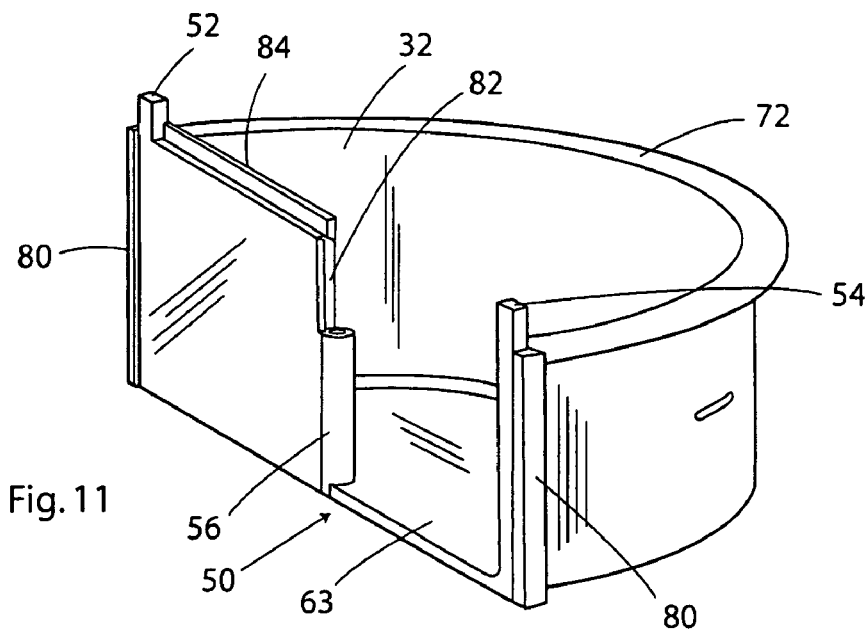
FIG. 11 is a further perspective enlarged view of a portion of the measuring structure of the FIG. 1 device.
Figure 10:
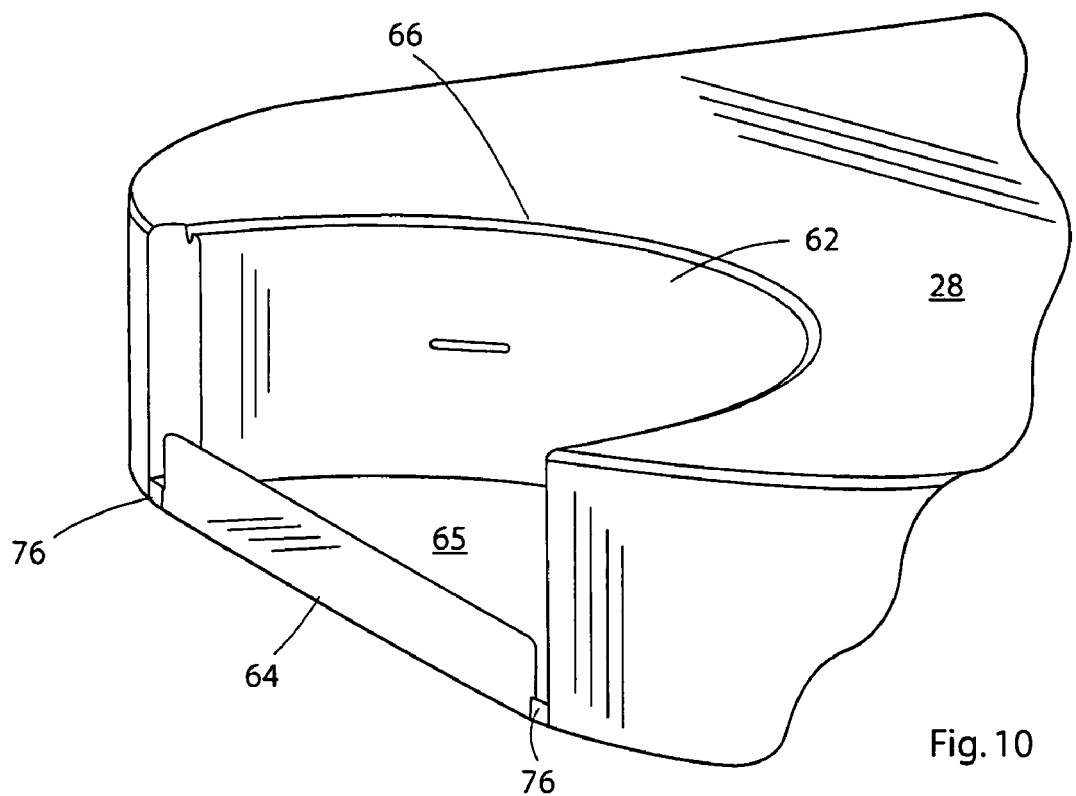
FIG. 10 is a further perspective view of a portion of the cutting board of the device shown in FIG. 1.

Referring to FIG. 11, the projections 52 and 54 fit upwardly into the barrier 36 to secure it to the cup, and they and the flange 84 are secured in place with adhesive.

The bottom of the cup 32 is indicated at 63, and the opening in the front side wall of the cup is indicated at 50. This opening is provided in order to facilitate washing of the measuring device.

Advantageously, the adjustable cup can be removed from the cutting board and placed into an automatic dishwasher and washed thoroughly without disassembly.

The adjustable measuring cup can take a number of forms. For example, an adjustable measuring cup such as the one shown in U.S. Pat. No. 5,325,717 can be used instead.

As mentioned above, the cutting board, and the cup and its parts can be molded from thermoplastic materials, with the exception of the pin 58 which is made of stainless steel.

As it can be seen from the foregoing, the cutting board device of the invention meets the objectives stated above admirably.

The above description of the invention is intended to be illustrative and not limiting. Various changes or modifications in the embodiments described may occur to those skilled in the art. These can be made without departing from the spirit or scope of the invention.

What is claimed is:

1. An adjustable measuring device comprising, in combination,
    a cutting board having an upper surface on which to cut food items,
    a substantially semi-cylindrical adjustable measuring container having an open top inlet and a movable barrier member mounted to rotate in said container for determining the volume of said container, with a cover member secured to rotate with said barrier member to cover the portion of said open top trailing said barrier member,
    said adjustable measuring container being releasably secured to said cutting board with said open top inlet being positioned adjacent said upper surface to receive food particles swept off of said upper surface,
    in which said cutting board has an outer edge and a recess in said edge, said adjustable measuring container being releasably retained within said recess said container having a support member with a handle extending outwardly from said container and said board and having said barrier member rotatably mounted thereto, and
    a barrier extending upwardly from said support member and positioned to form a barrier along said outer edge of said cutting board to deter food particles swept from said upper surface towards said adjustable measuring container from being swept off of said cutting board or onto said support member if they do not enter said container.

2. A device as in claim 1 in which said upper surface of said cutting board is planar and defines a first plane, said open top inlet of said adjustable measuring container having an upper edge defining a second lane plane, said second plane being at the same elevation as or below said first plane, said measuring container having a circular handle extending out from said cutting board.

3. An adjustable measuring container having
    a semi-cylindrical cup,
    a first cover member rotatably mounted to said cup and movable to cover a variable area of said cup,
    a first barrier member secured to said first cover member and extending into said cup to be rotatable with said first cover member to change the effective volume of said cup, and having an engagement structure to be engaged with the hand to rotate said first cover member, and a second cover member extending over said first cover member and having a handle and a second barrier member extending upwardly from said second cover member to impede the movement of material from the vicinity of said cup towards said handle.

4. An adjustable measuring container as in claim 3 in which said first barrier member is dimensioned to fit the contours of the interior walls of said cup, and a flexible plastic sealing element for sealing the junction between said first barrier member and said interior walls.

5. An adjustable measuring device comprising, in combination,
    a cutting board having an upper surface on which to cut food items,
    an adjustable measuring container having an open top inlet and a movable member for determining the volume of said container,
    said adjustable measuring container being releasably secured to said cutting board with said open top inlet being positioned adjacent said upper surface to receive food particle swept off of said upper surface, in which said container comprises a substantially semi-cylindrical cup and said movable member comprises a rotatable cover member positioned to cover a variable portion of said open top and inlet, and in which said adjustable measuring container includes a handle portion secured to and extending outwardly from said cup and carrying an upstanding barrier member positioned to extend upwardly above said surface of said cutting board to block the movement of food particles past said cup and off of said cutting board.

6. An adjustable measuring device comprising, in combination,
- a cutting board having an upper surface on which to cut food items,
- a substantially semi-cylindrical adjustable measuring container having an open top inlet and a movable barrier member mounted to rotate in said container for determining the volume of said container, with a cover member secured to rotate with said barrier member to cover the portion of said open top, trailing said barrier member,
- said adjustable measuring container being releasably secured to said cutting board with said open top inlet being positioned adjacent said upper surface to receive food particles swept off of said upper surface,
- in which said cutting board has an outer edge and a recess in said edge, said adjustable measuring container being releasably retained within said recess, said container having a support member with a handle extending outwardly from said container and said board and having said barrier member rotatable mounted thereto, and
- in which said support member has an upstanding barrier member extending therefrom, and said movable barrier member extends downwardly from a rotor mounted underneath said support member, there being an arcuate slot in said support member with a handle extending upwardly through said slot and secured to said rotor to facilitate adjustment of said container volume.

\* \* \* \* \*